(12) United States Patent
Sly et al.

(10) Patent No.: US 12,546,684 B2
(45) Date of Patent: Feb. 10, 2026

(54) CONTRAIL DETECTION CHANNEL FOR A LASER AIR DATA SYSTEM

(71) Applicant: Rosemount Aerospace Inc., Burnsville, MN (US)

(72) Inventors: Jaime A. Sly, Savage, MN (US); Joshua A. Boelman, Farmington, MN (US); Phillip Acott, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 383 days.

(21) Appl. No.: 18/360,735

(22) Filed: Jul. 27, 2023

(65) Prior Publication Data

US 2025/0035515 A1  Jan. 30, 2025

(51) Int. Cl.
*G01M 15/14* (2006.01)
*G01S 17/88* (2006.01)

(52) U.S. Cl.
CPC ............. *G01M 15/14* (2013.01); *G01S 17/88* (2013.01)

(58) Field of Classification Search
CPC .................................................... G01M 15/14
See application file for complete search history.

(56) References Cited

U.S. PATENT DOCUMENTS

| | | |
|---|---|---|
| 5,546,183 A | 8/1996 | Fegley et al. |
| 7,933,002 B2 | 4/2011 | Halldorsson |
| 9,518,965 B2 | 12/2016 | Swann |
| 12,025,982 B2 * | 7/2024 | Ray ....................... G05D 1/0094 |
| 2015/0284101 A1 | 10/2015 | Swann |
| 2021/0277839 A1 | 9/2021 | Madden et al. |
| 2021/0285851 A1 * | 9/2021 | Farouz-Fouquet .... B64D 47/00 |
| 2022/0332430 A1 | 10/2022 | Hiller |
| 2024/0052791 A1 * | 2/2024 | Stratton .................. G01W 1/08 |
| 2024/0167426 A1 * | 5/2024 | Lincoln ..................... F02C 9/28 |

FOREIGN PATENT DOCUMENTS

| | | |
|---|---|---|
| EP | 1544639 B1 | 6/2005 |
| EP | 3961012 A1 | 3/2022 |

OTHER PUBLICATIONS

Extended European Search Report dated Nov. 27, 2024, for corresponding European Patent Application No. 24191294.8, 11 pgs.

* cited by examiner

*Primary Examiner* — Eric S. McCall
(74) *Attorney, Agent, or Firm* — Kinney & Lange, P.A.

(57) ABSTRACT

Apparatus and associated methods relate to measuring metrics of a contrail produced by an aircraft engine. To measure such metrics, a beam of light is projected into a projection volume that intersects an exhaust path of the aircraft engine. Light from a reception volume that intersects the exhaust path of the aircraft engine is received. An intersection volume is formed by an intersection of the reception volume and the projection volume. The light received includes a reflected portion of the projected beam backscattered by the atmosphere from within the intersection volume. The reflected portion of light received is used to determine whether a contrail is forming within the intersection volume. An alert is generated in response to determination that a control is forming within the intersection volume.

20 Claims, 8 Drawing Sheets

CONTRAIL DETECTION CHANNEL FOR A LASER AIR DATA SYSTEM

BACKGROUND

Aircraft can form condensation trails or contrails as they disturb the atmosphere in various ways. Contrail formation is dependent on atmospheric conditions as well as on aircraft conditions. For example, atmospheric conditions that affect contrail formation include air temperature, air pressure, and humidity. Aircraft conditions that affect contrail formation include engine emissions, such as, for example, water vapor, CO2, fuel products, etc., as well as airflow disturbances caused by the aircraft surfaces during flight (e.g., condensation trails can form off a wing surface or winglet from the cavitation of air in very humid conditions).

Contrails act like a cirrus cloud (and can be difficult to distinguish therefrom). High relative-humidity conditions are most likely to produce long lasting contrails, whereas in low relative-humidity conditions, contrails, if produced at all, will readily evaporate. Contrails typically become visible when the aggregation and growth of water droplets and ice crystals exceed some threshold values. Typically, if contrails are formed, they will first become visible at roughly a short distance behind the aircraft.

SUMMARY

Some embodiments relate to a system for measuring metrics of a condensation trail (contrail) produced by an aircraft engine. The system includes a first air-data measurement channel and an air data processor. The first air-data measurement channel includes a first light projector and a first optical receiver. The first light projector is configured to project a first beam of light into a first projection volume that intersects an exhaust path of the aircraft engine. The first optical receiver is configured to receive light from a first reception volume that intersects the first projection volume, thereby forming a first intersection volume. The first intersection volume intersects the exhaust path of the aircraft engine. The light received by the first optical receiver includes a first reflected portion of the first projected beam of light backscattered by the atmosphere from within the first intersection volume. The air-data processor is configured to: i) determine whether a contrail is forming within the exhaust path of the aircraft engine based on the first reflected portion of light received by the first optical receiver; and ii) generate a signal in response to the air-data processor determining that a contrail is forming within the intersection volume.

Some embodiments relate to a method for measuring metrics of a condensation trail (contrail) produced by an aircraft engine. In the method, a first beam of light is projected, via a first light projector of a first air-data measurement channel, into a first projection volume that intersects an exhaust path of the aircraft engine. Light from a first reception volume is received, via a first optical receiver of the first air-data measurement channel. The first reception volume intersects the first projection volume, thereby forming a first intersection volume. The first intersection volume intersects the exhaust path of the aircraft engine. The light received by the first optical receiver includes a first reflected portion of the first projected beam backscattered by the atmosphere from within the first intersection volume. Whether a contrail is forming within the exhaust path of the aircraft engine is determined, via an air-data processor, based on the first reflected portion of the light received by the first optical receiver. A signal is generated, via the air-data processor, in response to the air-data processor determining that a contrail is forming within the intersection volume.

DETAILED DESCRIPTION

Apparatus and associated methods relate to measuring metrics of a contrail produced by an aircraft engine. To measure such metrics, a beam of light is projected into a projection volume that intersects an exhaust path of the aircraft engine. Light from a reception volume that intersects the exhaust path of the aircraft engine is received. An intersection volume is formed by an intersection of the reception volume and the projection volume. The light received includes a reflected portion of the projected beam backscattered by the atmosphere from within the intersection volume. The reflected portion of light received is used to determine whether a contrail is forming within the intersection volume. An alert is generated in response to determination that a control is forming within the intersection volume.

Some aircraft are equipped with laser air-data systems for optically measuring metrics of an atmosphere outside the aircraft. Such laser air-data systems project one or more beams of light, each typically a monochromatic beam of light, into the atmosphere. A reflected portion of each of the projected beams of light is then backscattered by aerosols (small particles that are suspended in the atmosphere, such as for example, dust, ash, water droplets, ice crystals, etc.), as well as by air molecules (e.g., $N_2$, $O_2$, $CO_2$, etc.) in the atmosphere. A wavelength spectrum (or frequency spectrum) of the reflected portion can be different from that of the projected beam. For example, the reflected portion can have a much broader wavelength spectrum than that of the projected beam of light, which is very narrow for a monochromatic beam of light. Moreover, amplitude variations within the spectrum of the reflected portion can arise. Such a wavelength spectrum of the reflected beam arises from the relative motions of the aircraft (or the laser air-data system) with respect to the backscattering aerosols in the atmosphere and with respect to the backscattering air molecules of the atmosphere. Such relative motions cause Doppler wavelength shifting (and corresponding Doppler frequency shifting) of photons reflected by aerosols and air molecules that are moving relative to the aircraft. Therefore, such relative motions of the aircraft with respect to the aerosols and/or air molecules, as well as other metrics of the atmosphere, can be determined from the wavelength spectrum of the reflected portion.

Although both aerosols and air molecules backscatter the projected beam of light, such backscattering is predominantly a result of different scattering mechanisms for aerosols versus air molecules. The size of the objects from which the light is backscattered determines which scattering mechanism predominates. For example, for air molecules, Rayleigh scattering typically predominates. For aerosols, Mie scattering typically predominates. Not only does the predominant scattering mechanism differ between aerosols and air molecules, but the spectrum corresponding to light backscattered by aerosols is also different than the spectrum corresponding to light backscattered by air molecules. Such differences arise because of differences in the relative motions of aerosols and air molecules. Aerosols are much larger than air molecules. Because aerosols are large in comparison to the air molecules, aerosols have a motion that is commensurate with whatever air currents are present in the atmosphere in which the aerosols are suspended. The air current can be thought of as an average of the motions of the air molecules. Aerosols all drift together with the air currents at nearly zero relative velocity with respect to one another. Thus, the wavelength spectrum of light reflected by aerosols is narrow, almost identical in width to the narrow spectrum of the projected beam of light. Although the width of the wavelength spectrum is like that of the wavelength spectrum of the projected beam of light, the actual wavelength that characterizes the wavelength spectrum of light reflected by aerosols (e.g., a mean wavelength or some other characterizing central wavelength of the spectrum) can be different from the wavelength that characterizes the wavelength spectrum of the projected beam of light. Such a difference between these two characteristic wavelengths is indicative of the relative motion of the aircraft with respect to the air currents present in the atmosphere in which the backscattering aerosols are suspended. These differences correspond to the relative airspeed of the aircraft in the directions of the reflected portion backscattered by aerosols.

Because air molecules in the atmosphere are much smaller than the average distance between these air molecules, air molecules travel large distances (relative to their tiny size) between collisions with other air molecules. Such collisions between pairs of air molecules are largely elastic in nature. Although the average velocity of air molecules can be characterized by the velocity of the air current, the air molecules themselves typically have velocities of magnitudes that greatly exceed the magnitude of the velocity of the air currents. The kinetic theory of gases characterizes and quantifies such constant (between collisions), rapid, and random motions of air molecules. The root-mean-square (RMS) average of air molecules has been shown to be:

$$v_{RMS} = \sqrt{\frac{3k_B T}{m}}, \quad (1)$$

where $k_B$ is Boltzmann's constant, T is the temperature of the air, and m is the mass of each air molecule. For air molecules, such RMS average velocities are very high—much higher than typical airspeeds of flying aircraft. Not only is the RMS average velocity of air molecules very high, but the standard deviation of the velocities of air molecules is also very high. Such high standard deviations result in broadening of the wavelength spectrum of light backscattered by air molecules.

Figure 1:
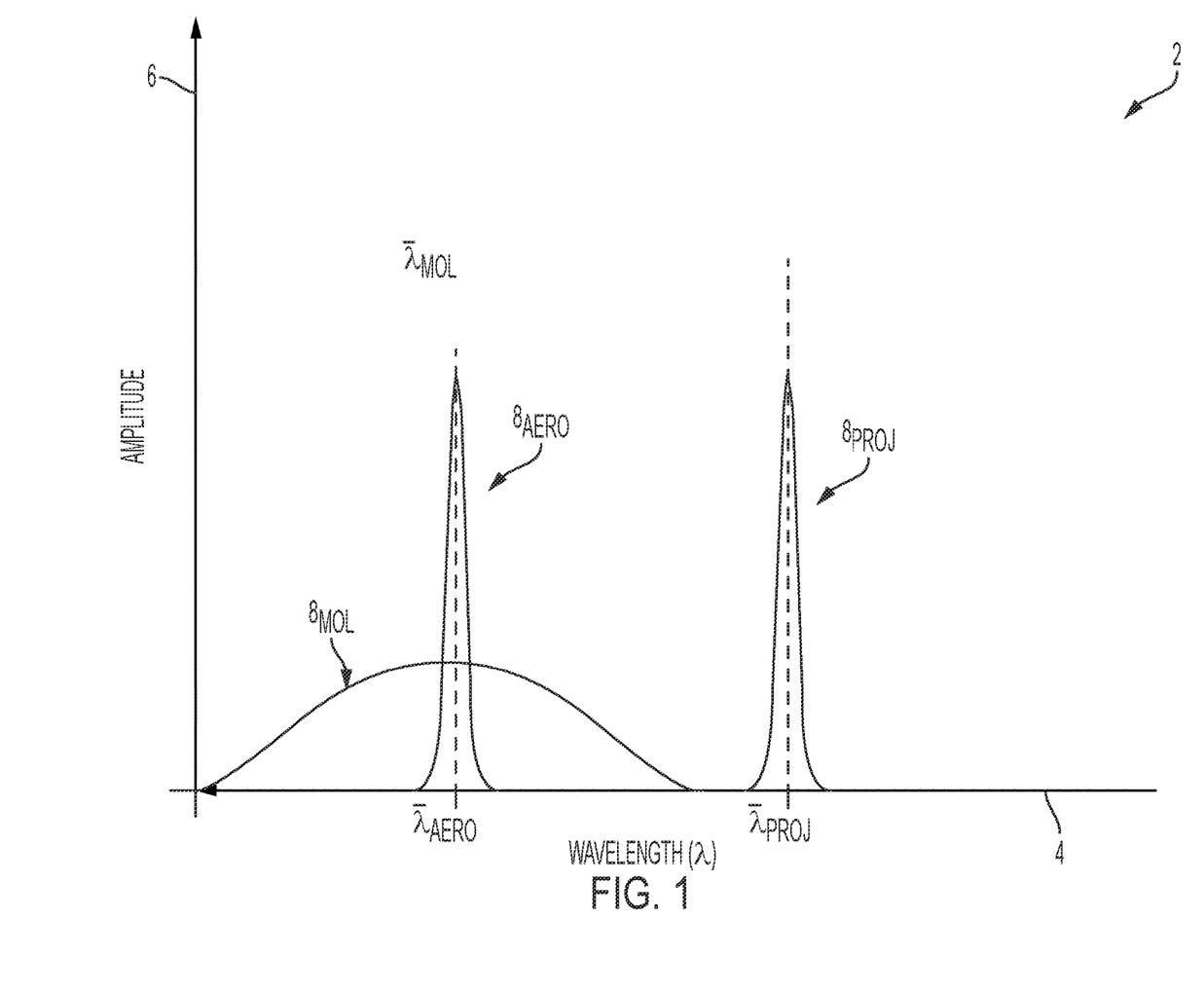
FIG. 1 is a graph depicting wavelength spectra of a monochromatic projected beam of light and light backscattered by aerosols and air molecules.

FIG. 1 is a graph depicting wavelength spectra of a monochromatic projected beam of light and light backscattered by aerosols and air molecules. In FIG. 1, graph 2 includes horizontal axis 4, vertical axis 6 and wavelength spectra $8_{PROJ}$, $8_{AERO}$ and $8_{MOL}$. Horizontal axis 4 is indicative of wavelength, and vertical axis 6 is indicative of amplitude. Projected-beam wavelength spectrum $8_{PROJ}$ corresponds to the projected beam of light. Projected-beam wavelength spectrum $8_{PROJ}$ has a characterizing central wavelength of $\overline{\lambda}_{PROJ}$. Projected-beam wavelength spectrum $8_{PROJ}$ has a characteristic breadth (e.g., full-width at half-maximum amplitude) of $\Delta\lambda_{PROJ}$. Aerosol-backscattered wavelength spectrum $8_{AERO}$ corresponds to the light backscattered by aerosols in the atmosphere outside the aircraft. Aerosol-backscattered wavelength spectrum $8_{AERO}$ has a characterizing central wavelength of $\overline{\lambda}_{AERO}$. Aerosol-backscattered wavelength spectrum $8_{AERO}$ has a characteristic breadth of $\Delta\lambda_{AERO}$. Molecule-backscattered wavelength spectrum $8_{MOL}$ corresponds to the light backscattered by air molecules of the atmosphere outside the aircraft. Molecule-backscattered wavelength spectrum $8_{MOL}$ has a characterizing central wavelength of $\overline{\lambda}_{MOL}$. Molecule-backscattered wavelength spectrum $8_{MOL}$ has a characteristic breadth of $\Delta\lambda_{MOL}$. Although depicted as separate spectra (i.e., aerosol-backscattered wavelength spectrum $8_{AERO}$ and molecule-backscattered wavelength spectrum $8_{MOL}$), the spectrum of the reflected portion will be a combination (i.e., a sum) of wavelength spectrum $8_{AERO}$ and wavelength spectrum $8_{MOL}$. The sum of aerosol-backscattered wavelength spectrum $8_{AERO}$ and molecule-backscattered wavelength spectrum $8_{MOL}$ can be referred to as a Doppler-shifted wavelength spectrum of the reflected portion.

Note that the characterizing central wavelength $\overline{\lambda}_{AERO}$ of light backscattered by aerosols is identical to the characterizing central wavelength $\overline{\lambda}_{MOL}$ of light backscattered by the air molecules. This is because the RMS average velocity of air molecules is equal to the air current. Therefore, the RMS average Doppler shift due to molecular backscattering is equal to the average Doppler shift due to aerosol backscattering. Note also that both characterizing central wavelengths $\overline{\lambda}_{AERO}$ and $\overline{\lambda}_{MOL}$ of light backscattered by aerosols and air molecules are not equal to the characterizing central wavelength $\overline{\lambda}_{PROJ}$ of the projected beam of light. This difference in the characterizing central wavelengths between $\overline{\lambda}_{PROJ}$ and either of $\overline{\lambda}_{AERO}$ or $\overline{\lambda}_{MOL}$ is indicative of the airspeed of the aircraft with respect to the air current of the atmosphere outside the aircraft. Finally, note the similarities and differences in the shapes and breadths $\Delta\lambda_{PROJ}$, $\Delta\lambda_{AERO}$, and $\Delta\lambda_{MOL}$ of the spectra $8_{PROJ}$, $8_{AERO}$ and $8_{MOL}$, respectively. The specific shapes and breadths $\Delta\lambda_{PROJ}$, $\Delta\lambda_{AERO}$, and $\Delta\lambda_{MOL}$ of these spectra $8_{PROJ}$, $8_{AERO}$ and $8_{MOL}$ are indicative of various metrics of the atmosphere, such as, for example, static air temperature, static air pressure, airspeed, as well as metrics of particles in the atmosphere. Such metrics can then be communicated to the pilot, crew and/or aircraft management system(s) of the aircraft so as to be used to control the flight of the aircraft.

There has been recent concern that contrail formation might affect the climate, and so avoiding contrail formation has become a recent endeavor. Laser air-data systems can be adapted to detect formation of contrails in the exhaust path of aircraft engines and to measure metrics of such contrails, as will be described in more detail below. Such aerosols, if detected within the exhaust path of the aircraft engine could be indicative of contrail formation, but it could also be indicative of aerosols formed by other methods (e.g., passing through a cloud, other aerosols that are products of the aircraft engine, etc.). To distinguish between aerosols of contrails being formatted, and such other aerosols, the electrical signals generated by the laser air-data system configured to measure metrics of air data within the exhaust path of the aircraft can be used in conjunction with other electrical signals (e.g., engine metrics, and electrical signals generated by laser air-data systems configured to measure metrics of air data in the undisturbed atmosphere outside a boundary layer about the aircraft.

Direct contrail detection also can be used in conjunction with predictive models for aircraft routing to avoid producing potentially harmful, long duration contrails contributing to global warming. Although, contrails can be detected even before such accumulation and growth of ice crystals and/or water droplets make the contrail visible. While prediction models and flight planning could be used to optimize a flight route, direct measurement of a contrail beginning to form could provide real-time feedback to the pilot for both sustainability applications as well as low observability. The data also be fed back to either a prediction model onboard or provided offboard for further research and prediction enhancement or over aircraft/aircraft communications.

Figure 2:
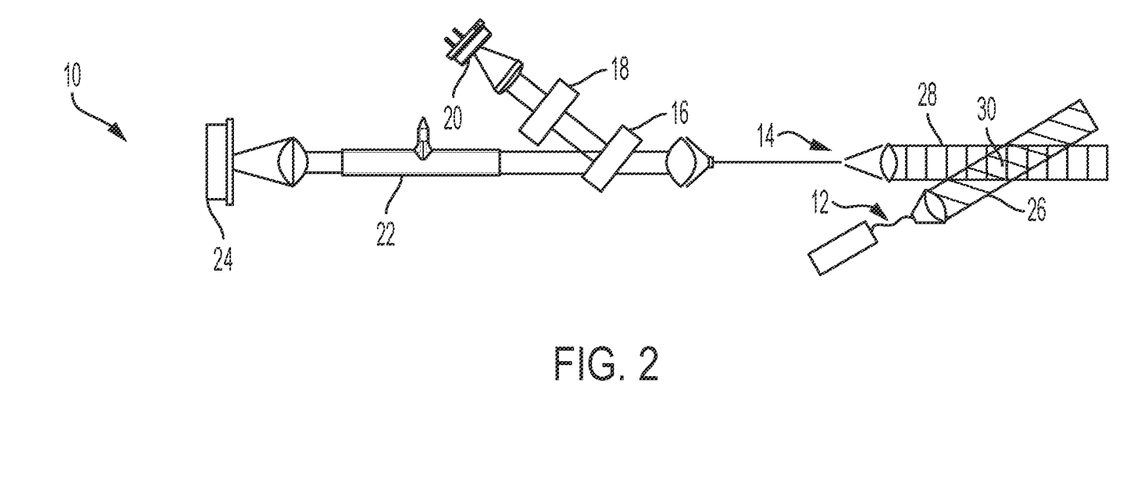
FIG. 2 is a schematic diagram of a laser air-data system that has background-light sample and correction capability.

FIG. 2 is a schematic diagram of a laser air-data system that has background-light sample and correction capability. Such a laser air-data system can be used for measuring metrics of air data of an atmosphere, such as, for example, outside an aircraft. The general principle of operation of laser air-data system 10 is to determine metrics of air-data based on the Doppler-shifted wavelength spectrum of a reflected portion of light backscattered by the aerosols and/or air molecules in the atmosphere. The Doppler-shifted reflected portion is a combination (i.e., a sum) of the wavelength spectrum corresponding to light backscattered by aerosols in the atmosphere and the wavelength spectrum corresponding to light backscattered by air molecules of the atmosphere, as depicted in FIG. 1 above. In FIG. 2, laser air-data system 10 includes light projector 12, optical receiver 14, background rejection filter 16, background sampling filter 18, first optical detector 20, vapor cell filter 22, and second optical detector 24.

Light projector 12 projects a beam of light into a projection volume 26 of the atmosphere. Projection volume 26 is determined by the optical design, location, and alignment of light projector 12. The projected beam of light generally is collimated by a collimating lens. Typically, the projected beam of light is of a distinct wavelength (i.e., narrow band emission), such as light generated by a laser. Moreover, light projector 12 can be tunable, thereby enabling the wavelength $\lambda_{PROJ}(t)$ (and frequency) of the projected beam of light to be swept over a projection wavelength band $\Delta\lambda_{PROJ}$ of wavelengths about a nominal wavelength or target wavelength $\lambda_{TARG}$. This is typically done in a triangular fashion, in which the wavelength $\lambda_{PROJ}(t)$ begins at a minimum wavelength $\lambda_{MIN}$, then is linearly swept up to a maximum value $\lambda_{MAX}$, and then is linearly swept down to the minimum wavelength $\lambda_{MIN}$. This is then repeated in periodic fashion. As the wavelength $\lambda_{PROJ}(t)$ of the projected beam of light is swept through wavelengths, the wavelengths of the Doppler-shifted wavelength spectrum of the reflected portion will be similarly swept.

Optical receiver 14 is configured to receive light from reception volume 28 of the atmosphere outside the aircraft. Reception volume 28 is determined by the optical design, location, and alignment of optical receiver 14. Reception volume 28 is aligned with projection volume 26 such that reception volume 28 intersects projection volume 26, thereby forming intersection volumes 30. Intersection volume 30 contains the region of atmosphere capable of backscattering the beam of light projected by light projector 12 so as to be received by optical receiver 14. Any metrics of air data measured by laser air-data system 10 correspond to such a region of the atmosphere. The light received by optical receiver 14 includes both: i) a reflected portion of the projected beam backscattered by the atmosphere from within intersection volume 30; and ii) background light from within the reception volume. The reflected portion is indicative of various air-data metrics due to Doppler shifting of the reflected portion by the aerosols and air molecules in the atmosphere. Optical receiver 14, however, receives not just the reflected portion but optical receiver 14 also receives the background light, which is not the result of backscattering of the projected beams. Because the metrics of the air data are determined only from the reflected portion of the light received by optical receiver 14, any background light received by optical receiver 14 is a noise electrical signal. In many cases, the background portion can be large in comparison with the reflection portion, thereby making it difficult to determine the metrics of air data desired. Thus, it would be helpful if one could measure or estimate a magnitude of the background portion so as to ultimately excise (e.g., remove or subtract) the estimated background portion from the total light received by the optical receiver. Laser air-data system 10 addresses this problem in two ways, as will be described in more detail below. First, laser air-data system 10 uses background rejection filter 16 to reduce a spectral bandwidth of light to be processed of the background light received by receiver 14. Second, laser air-data system 10 estimates the amount of the background light that is within the spectral bandwidth of light to be processed as permitted by background rejection filter 16, and then subtracts such an estimated amount from the light to be processed.

The light received by optical receiver 14 is directed, via optical fiber 30 to background rejection filter 16. Background rejection filter 16 is configured to filter (e.g., separate) the light received by optical receiver 14 into a beam sampling portion (i.e., the portion to be used for measuring metrics of air data) and a complementary non-sampling portion (a portion of which will be used to estimate the background light remaining in the beam sampling portion). Such separation of portions is typically performed by using an optical filter that transmits one of these two portions while reflecting or diffracting the other of the two portions. Background rejection filter 16 has a pass-band wide enough to pass wavelengths of the Doppler-shifted wavelength spectrum of the reflected portion as part of the beam sampling portion but narrow enough to reduce or minimize the background light included in the beam sampling portion. Although the pass-band of background rejection filter 16 filters much of the background light received by optical receiver 14, background rejection filter 16 still permits any background light having wavelengths that fall within the pass-band of background rejection filter 16 to be transmitted along with the reflected portion. An estimate of the background light that has wavelengths within the pass-band of background rejection filter 16 can be obtained by measuring the amplitudes of background light at wavelengths nearby but outside the pass-band of background rejection filter 16. Background light at wavelengths nearby but outside the pass-band of background rejection filter 16 are included in the complementary non-sampling portion separated from the beam sampling portion by background rejection filter 16.

The complementary non-sampling portion is used to estimate the magnitude of the background portion that remains within the beam sampling portion. To do so, background sampling filter 18 is configured to filter a background sampling portion (i.e., the portion that will be used to estimate the background light remaining within the beam sampling portion) from the complementary non-sampling portion. The background sampling portion includes wavelengths immediately adjacent to the beam sampling portion. For example, in some embodiments, the background sampling portion has a wavelength band that extends both above and below wavelengths of the beam sampling portion (i.e., wavelengths above and below the pass-band of the background rejection filter 16). In some embodiments, the background sampling portion includes only wavelengths on one side of wavelengths of the beam sampling portion. Such wavelengths of the background sampling portion, being so near to those within the beam sampling portion, can well represent, or at least are predictive of, any background light within the beam sampling portion. Such background light can include light directed along and within the reception volume 28 and originating from natural sources (e.g., the sun, moon, etc.) and/or light originating from artificial sources (e.g., aircraft lighting, building lighting, etc.). First optical detector 20 is configured to detect such a background sampling portion, thereby generating an electrical signal indicative of the background light within the beam sampling portion.

The beam sampling portion of the light is filtered by background rejection filter 16 and transmitted, via optical fiber 32, through vapor cell filter 22, to second optical detector 24. The beam sampling portion includes the Doppler-shifted wavelength spectrum of the reflected portion. Because the wavelength $\lambda_{PROJ}(t)$ of the projected beam of light is swept in periodic fashion by light projector 12, the wavelengths of the Doppler-shifted wavelength spectrum of the reflected portion are being swept in periodic fashion as well. Vapor cell filter 22 is a very narrow band-pass or band-stop filter so as to only pass or block only a very narrow-band portion of the Doppler-shifted wavelength spectrum of the reflected portion. In response to sweeping the wavelength $\lambda_{PROJ}(t)$ of the projected beam of light, the wavelengths of the Doppler-shifted wavelength spectrum of the reflected portion are being swept through a characteristic wavelength $\lambda_{VCF}$ (i.e., a central wavelength of the very narrow-band of vapor cell filter 22) of vapor cell filter 22. Thus, as the wavelengths of the reflected portion are being swept through this characteristic wavelength $\lambda_{VCF}$ of vapor cell filter 22, only those wavelengths within the band-pass or band-stop region of vapor cell filter 22 will be passed or blocked, respectively. In both cases (i.e., for both band-pass and band-stop configurations), the Doppler-shifted wavelength spectrum of the reflected portion will be converted to a temporal response exhibiting temporal pulses. Such temporal pulses will have the same or similar profile (or shape) as the profile of the Doppler-shifted wavelength spectrum of the reflected portion. Second optical detector 24 is configured to detect such the beam sampling portion as filtered by vapor cell filter 22, thereby generating an electrical signal indicative of the Doppler-shifted wavelength spectrum of the reflected portion. In such a manner, the Doppler-shifted wavelength spectrum of the reflected portion can be determined.

Although second optical detector 24 generates an electrical signal indicative of the Doppler-shifted wavelength spectrum of the reflected portion, the electrical signal generated also includes a background portion indicative of background light having wavelengths within the pass-band of background rejection filter 16. To correct for such a background portion, an air-data processor is used. Such an air-data processor can be any processor capable of performing such electrical signal processing as will be described below. For example, the air-data processor can include any one or more of a microprocessor, a controller, a digital electrical signal processor (DSP), an application specific integrated circuit (ASIC), a field-programmable gate array (FPGA), or other equivalent discrete or integrated logic circuitry. The air-data processor can be configured to receive both the electrical signal generated by first optical detector 20 and the electrical signal generated by second optical detector 24. The air data processor estimates portion indicative of background light having wavelengths within the pass-band of background rejection filter 16, as generated by second optical detector 24, based on the electrical signal generated by first optical sensor 20. The air-data processor then subtracts the estimated portion from the electrical signal generated by second optical detector 24, leaving only an electrical signal indicative of the Doppler-shifted wavelength spectrum of the reflected portion.

Because the reflected portion of the light received by optical receiver 14 is generated by backscattering within intersection volumes 30, location of the intersection volumes 30 determines a location where the metrics of the air data pertain. For example, for airspeed metrics, intersection volume 30 can be designed to exclude the boundary layer adjacent to the aircraft (e.g., locations within a minimum distance of about a meter from the aircraft), where the air has been perturbed by the aircraft. Such control of location of intersection volume 30 is performed by locating optical receiver 14 at a predetermined distance from light projector 12 and canting directions of the reception volume 28 and projection volume 26 into one another (e.g., by a few degrees). In such a configuration, intersection of the projection and reception volumes will not begin until some predetermined distance from the aircraft, so as to exclude the boundary layer. Such control of locations of intersection volume 30 can be performed so as to maximize sensitivity and accuracy as determined by computational fluid dynamics analyses.

Laser air-data system 10 can distinguish between Mie scattering and Rayleigh scattering portions of the reflected light. Because the motion of air molecules in the atmosphere has broad distribution due to random motion of air molecules, Rayleigh scattering by the air molecules in the atmosphere will result in a much broader wavelength spectrum than the wavelength spectrum resulting from Mie scattering by the aerosol particles in the atmosphere. Thus, a Mie-scattering portion of the reflected portion has a very narrow band, which can be almost entirely stopped (or passed) by vapor cell filter 22, thereby causing very distinct pulses in the electrical signal generated by second optical detector 24. Conversely, even when the peak of the spectrum of the Rayleigh-scattering portion of the reflected portion is stopped (or passed) by the vapor cell filter 22, wavelengths of the Rayleigh-scattering portion that are outside the vapor cell filter's stop-band (or pass-band), but within the pass-band of the background rejection filter 16, will still be detected by second optical detector 24.

Although laser air-data system 10 is a single channel laser air-data system, such a system can be multiply implemented to form multi-channel laser air-data systems. A single channel laser air-data system can measure airspeed in one dimension, but multi-channel air data systems, if having channels aligned in directions that span three-dimensional space, can measure airspeed in three dimensions. Because of such multi-dimensional capability, aircraft based laser air-data systems typically include three or more channels.

Figure 3:
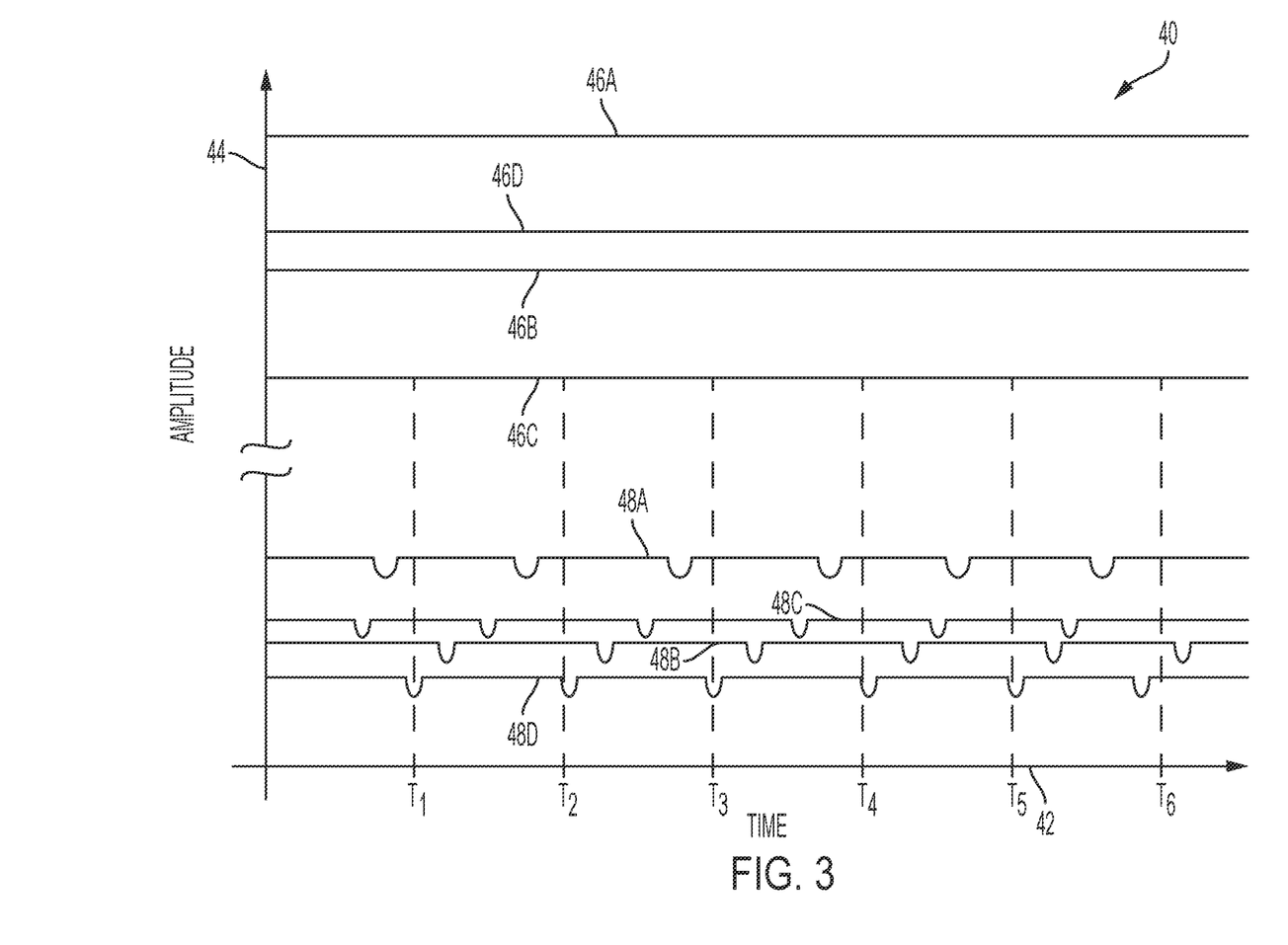
FIG. 3 is a graph depicting amplitude/time relations of electrical signals generated by optical detectors of a four-channel laser air-data system.

FIG. 3 is a graph depicting amplitude/time relations of electrical signals generated by optical detectors of a four-channel laser air-data system. In FIG. 3, graph 40 includes horizontal axis 42, vertical axis 44, first amplitude/time relations 46A-46D and second amplitude/time relations 48A-48D. Horizontal axis 42 is indicative of time, and vertical axis 44 is indicative of amplitude of electrical signals generated by first optical detectors 20A-20D or second optical detectors 24A-24D. The suffixes A-D identify to which of the four-channels each of the optical detectors belongs. Each of the four channels A, B, C, and D can be a single-channel laser air-data system, such as laser air-data system 10, as depicted in FIG. 2. Thus, optical detectors 20A and 24A correspond to optical detectors 20 and 24, respectively, of the channel A instantiation of laser air-data system 10, as depicted in FIG. 2. Each channel, however, is directed in a different direction from one another, thereby permitting determination of airspeed in three dimensions. Annotating the horizontal axis are times $T_1$-$T_6$ at which times the wavelength $\lambda_{PROJ}(t)$ of the projected beam of light is swept through and is equal to the characteristic wavelength $\lambda_{VCF}$ of vapor cell filters 22A-22D. First amplitude/time relations 46A-46D indicate the amplitudes of the electrical signals generated by first optical detectors 20A-20D, and second amplitude/time relations 46A-46D indicate the amplitudes of the electrical signals generated by second optical detectors 24A-24D. Each of first optical detectors 20A-20D is used for estimating the amplitude of the background light contribution to the electrical signal generated by the corresponding second optical detector 24A-24D. Each of first amplitude/time relations 46A-46D is relatively static, in that the swept projected beam contributes very little, if any, to the light detected by first optical detectors 20A-20D. Because each optical receiver 14A, 14B, 14C and 14D that receives the light that is detected by the corresponding first optical detectors 20A, 20B, 20C or 20D is pointed in a direction different from the others optical receivers, the amplitudes of amplitude/time relations 46A-46D can be different, one from another. For example, the background light contribution can be different in different directions.

Each of second amplitude/time relations 48A-48D has a dynamic component that is caused by the interaction of the wavelength sweep of the Doppler-shifted wavelength spectrum of the reflected portion and vapor cell filter 22A-22D. These dynamic components of the amplitude/time relations 48A-46D are indicative of various metrics of air data. Second amplitude/time relations 48A-48D are periodic as a result of the periodic nature of the projected beams of light (i.e., the sweeping of the wavelength). The peaks or valleys of each of the second amplitude/time relations 48A-48D are indicative of the relative airspeed in the vector directions of the reflection volumes. The relative airspeeds in such directions are determined by the Doppler shifts (i.e., frequency and wavelength shifts of the light backscattered by the aerosols and/or air molecules in relative motion to the aircraft) wavelength difference between the characteristic wavelength $\lambda_{VCF}$ of vapor cell filters 22A-22D and the wavelengths $\lambda_{PROJ}(t)$ of the projected beam of light at the time $t_{PEAK}$ of the peak. These relative airspeeds can then be linearly combined so as to generate airspeeds in the primary coordinate directions of the aircraft (e.g., forward/aft, lateral, and vertical).

Figure 4:
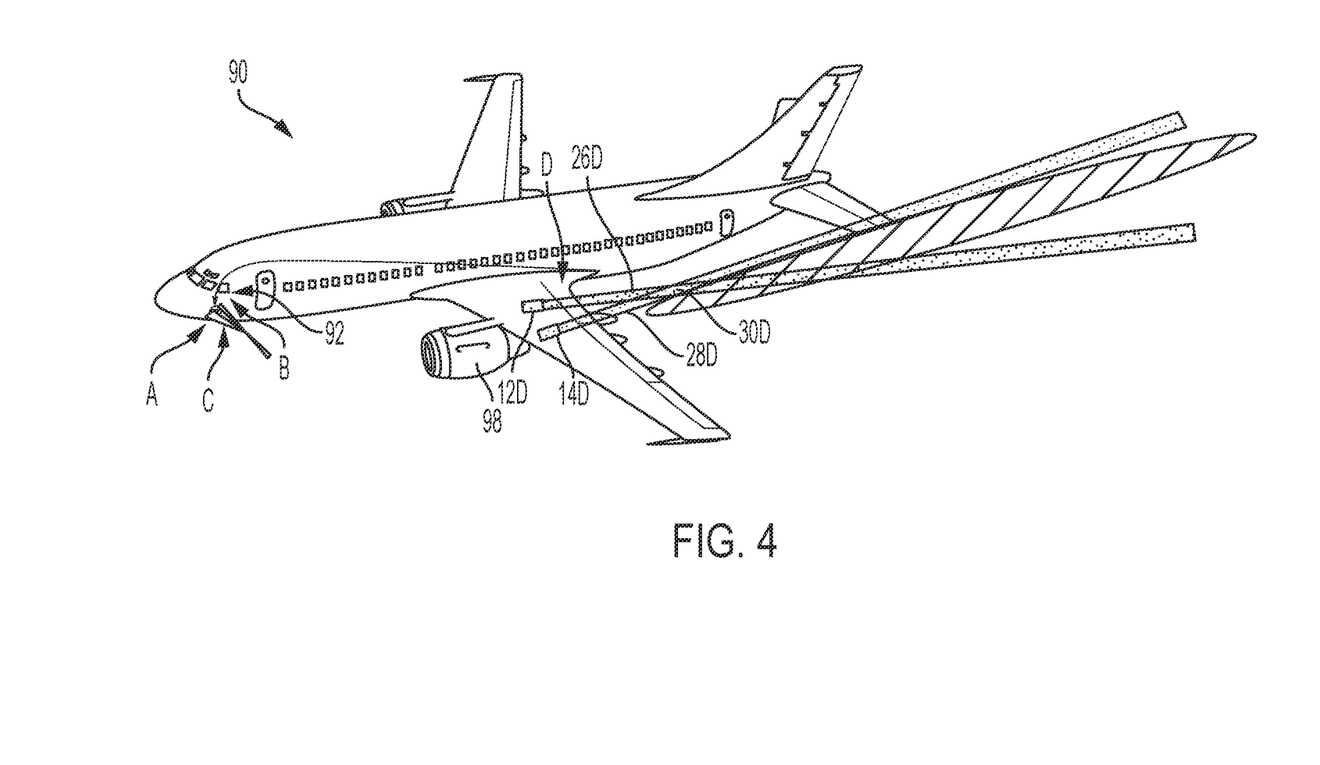
FIG. 4 is a schematic diagram of an aircraft equipped with a contrail detection system.

FIG. 4 is a schematic diagram of an aircraft equipped with a contrail detection system. In FIG. 4, aircraft 90 is equipped with laser air-data system 92. In the depicted example, laser air-data system 92 has four air-data measurement channels A-D, three of which—channels A-C—configured to measure metrics of an undisturbed atmosphere outside the boundary layer about the aircraft near the nose of aircraft 90 and one of which—channel D—configured to detect whether a contrail is forming in the exhaust path 96 of aircraft engine 98. Each of channels A-D can be any of various air-data systems that are capable of detecting aerosols in the atmosphere, but herein laser air-data system 10 as depicted in FIG. 2 will be used as a vehicle for describing operation of each of channels A-D. As described above, three channels, such as, for example, channels A-C, are sufficient for measuring airspeed in three dimensions, as well as other metrics of the atmosphere. Channel D includes light projector 12D, which projects a beam of light into projection volume 26D. Projection volume 26D intersects exhaust path 96 of aircraft engine 98. As depicted in FIG. 4, projector 12D and optical detector 14D are mounted directly above aircraft engine 98 thereby laterally aligning projection volume 26D and reception volume 28D with exhaust path 96 of aircraft engine 98. Channel D includes optical receiver 14D, which receives light from reception volume 28D. Reception volume 28D intersects projection volume 26D, thereby forming intersection volume 30D. Light projector 12D and optical receiver 14D are aligned so as to form intersection volume 30D within, or at least intersecting, exhaust path 96. Such a configuration permits optical receiver 14D to receive light backscattered by aerosols (e.g., water droplets, ice particles, other aerosols form aircraft engine 98, etc.) that form or reside within exhaust path 96 of aircraft engine 98. As described above, light received by optical receiver 14D includes a reflected portion of the projected beam backscattered by the atmosphere from within the intersection volume. Such a reflected portion can be indicative of contrail formation within exhaust path 96 of aircraft engine 98.

Channel D of laser air-data system 92 can include the elements of laser air-data system 10 as described above with reference to FIG. 2. Laser air-data system 10 includes a vapor cell filter which provides capability to distinguish between Mie scattering and Rayleigh scattering. Laser air-data system 10 ultimately generates electrical pulses, the shapes of which indicate the two scattering mechanisms. Laser air-data system 92 can distinguish Mie-scattering portions from Rayleigh-scattering portions of the Doppler-shifted wavelength spectrum of the reflected portion based on the pulses measured by laser air-data system 10. Because the Mie-scattering portion of the reflected portion has a narrow band spectrum, the Mie-scattering portion can be completely, or nearly completed, filtered by the vapor cell filter 22 (as depicted in FIG. 1). Thus, when the pulses generated by second optical detector 24 of laser air-data system 10 reach their valleys (or peaks), after such vapor cell filtering, the Mie-scattering makes no contribution to the electrical signal generated by second optical detector 24. The shoulders on either temporal sides of such a valley (or peak) however, include the Mie-scattering contribution to the electrical signal generated by second optical detector 24. The lower frequency portion of the pulse represents the Rayleigh-scattering contribution to the electrical signal generated by second optical detector 24. Thus, the Mie-scattering contribution to such electrical pulses can be determined by taking a difference between the amplitudes at the shoulders on either side of the high-frequency portion of the pulse and the amplitude at the peak or valley of the high-frequency portion of the pulse.

The Mie-scattering portion of or contribution to the electrical signal generated by second optical detector 24 for channel D is indicative of aerosols in exhaust path 96 of aircraft engine 98. Such aerosols can be those of a contrail being formed, those of a cloud within which aircraft 90 is flying, or other aerosols produced by aircraft engine 98. Other aerosols produced by aircraft engine 98 can be predicted based on an engine aerosol formation model. Such an engine aerosol formation model can estimate or predict the formation of such other aerosols produced by aircraft engine 98 based on operating metrics of aircraft engine 98 and metrics of the undisturbed atmosphere outside the boundary layer. After predicting or estimating such aerosols produced, the estimated aerosols can be subtracted from the total measured by laser air-data system 10 of channel D. Then, to distinguish between contrail formation and the presence of clouds, the Mie-scattering portions (or the Mie-scattering portions with the engine produced aerosols subtracted therefrom) of the pulses determined by channel D can be compared with Mie-scattering portions of pulses determined by channels A-C. Based on such a comparison, laser air-data system 92 can determine if excess aerosols (i.e., the difference between aerosol formation in the exhaust path of the aircraft and aerosol formation in the undisturbed air outside the boundary layer of the aircraft) are forming in exhaust path 96 or aircraft engine 98. For example, if a ratio (or difference) between the Mie-scattering portions of the detected signals of channel D and those of channels A-C increases, then such a ratio (or difference) can be indicative of excess aerosols being formed in exhaust path 96 of aircraft engine 98.

Figure 5:
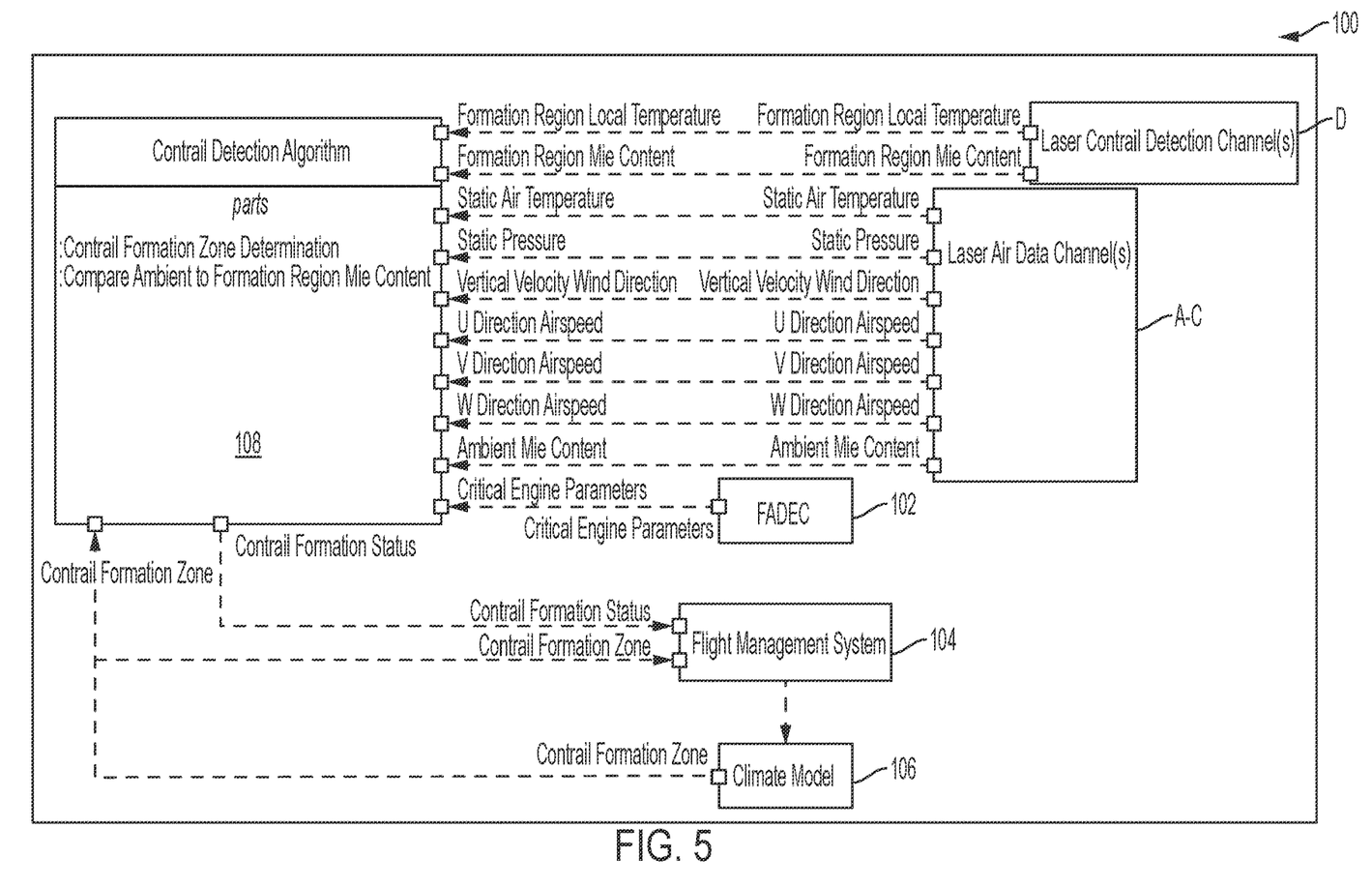
FIG. 5 is a functional block diagram of an example of a contrail detection system of an air data system having a contrail detection channel.

FIG. 5 is a functional block diagram of an example of a contrail detection system of an air data system having a contrail detection channel. In FIG. 5, contrail detection system 100 includes laser air-data channels A-C, laser contrail detection channel D, FADEC 102, flight management system 104, climate model 106 and contrail detection algorithm 108. Laser air-data channels A-C generate signals indicative of static air temperature, static pressure, true vertical wind velocity (e.g., vertical wind velocity with respect to level ground), airspeed in three-dimensions, as well as ambient-region Mie-scattering content. Laser contrail detection channel D generates formation region local temperature and formation-region Mie-scattering content. Control detection algorithm 108 receives these signals generated by channels A-D as well as additional signals from FADEC 102 and climate model 106. Control detection algorithm 108 then determines whether a contrail is forming in the exhaust path of the aircraft engine and sends a signal indicative of such a determination to flight management system 104. Flight management system 104 can then suggest an elevation at which the aircraft would not form a contrail.

Control detection algorithm 108 determines whether a contrail is forming by first comparing ambient Mie content to formation-region Mie content. Such a comparison can be performed either geometrically or arithmetically (i.e., based on a ratio of or based on a difference between ambient and formation region Mie content). If the Mie content of the formation region (i.e., the exhaust path of the aircraft engine) exceeds the Mie content of the ambient region (i.e., the undisturbed air outside the boundary layer about the aircraft), then excess aerosol formation is taking place within the formation region. In some embodiments, control detection algorithm 108 determines that excess aerosols are forming in the exhaust path of the aircraft if a ratio of formation-region Mie-scattering content to ambient-region Mie-scattering content exceeds a predetermined value. In other embodiments, control detection algorithm 108 determines that excess aerosols are forming in the exhaust path of the aircraft if a difference between formation-region Mie-scattering content and ambient-region Mie-scattering content exceeds a predetermined value. Such predetermined values are indicative of such ratios and differences represent little or no excess aerosol formation in the exhaust path of the aircraft engine. Control detection algorithm 108 generates a signal indicative of whether a contrail is forming in the exhaust path of the aircraft and transmits the signal to flight management system 104.

Control detection algorithm 108 also receives control formation zone data from climate model 106. Such control formation zone data can be predictive of persistence of a contrail after formation of the contrail in the exhaust path of the aircraft engine. Contrails that do not long persist can be treated differently than those that will long persist. Control detection algorithm 108 determines persistence based on the control formation zone data along with the air-data (e.g., ambient temperature, static pressure, altitude, humidity, updraft, etc.) corresponding the ambient-region of the atmosphere in which any contrail might be formed. In some embodiments, control detection algorithm also determines persistence at various other altitudes so as to be able to suggest alternative altitudes in which persistence of contrails would be unlikely. Flight management system 104 then generates an alert in response to receiving signals indicative of contrail formation and contrail persistence in the exhaust path of the aircraft.

Figure 6:
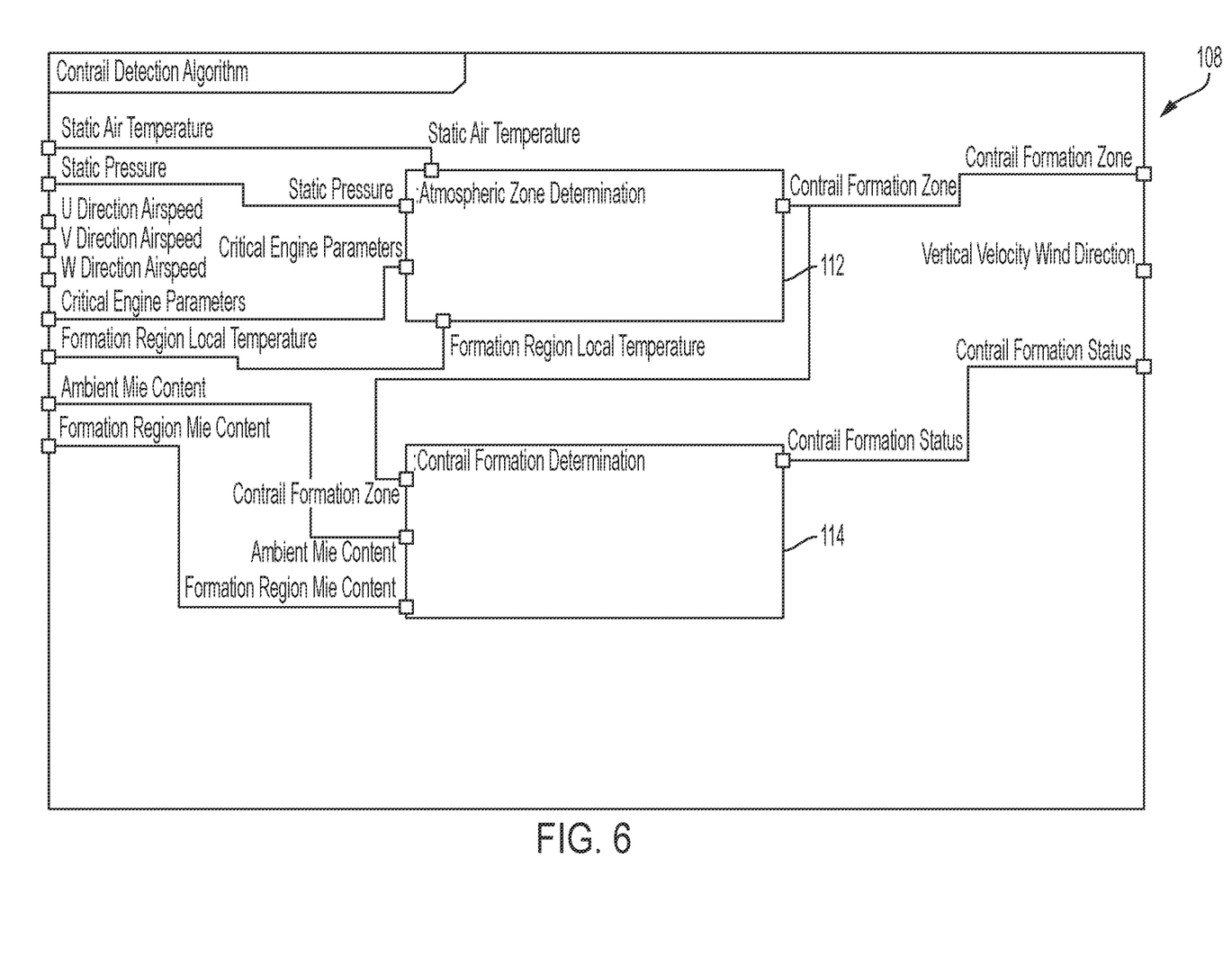
FIG. 6 is a functional block diagram of a contrail detection algorithm.

FIG. 6 is a functional block diagram of a contrail detection algorithm. FIG. 6 depicts an embodiment of inner interconnectivity of various signals used by control detection algorithm 108 as depicted in FIG. 5. In FIG. 6, contrail detection algorithm 108 includes atmospheric zone determination module 112 and contrail formation determination module 114, the two modules that determine contrail persistence and contrail formation, respectively. Atmospheric zone determination module 112 receives the signals indicative of static air temperature, static pressure, as well as critical engine parameters and formation region local temperature. Based on these signals received, atmospheric zone determination module 112 generates a signal(s) indicative of the atmospheric conditions in the contrail formation zone (i.e., the exhaust path 96 or aircraft engine 98). In some embodiments, atmospheric zone determination module 112 also determines whether the contrail will persist in the contrail formation region, should a contrail form therein. Contrail formation determination module 114 receives the signal(s) indicative of the atmospheric conditions in the contrail formation zone, as well as signals indicative of Mie-scattering content in both the ambient region and in the contrail formation region. Based on the received signals, contrail formation determination module 114 determines whether a contrail is forming in the contrail formation region. Control determination algorithm 108 then generates signals indicative of such determinations and transmits such signals to flight management system 104 (as depicted in FIG. 5).

Figure 7:
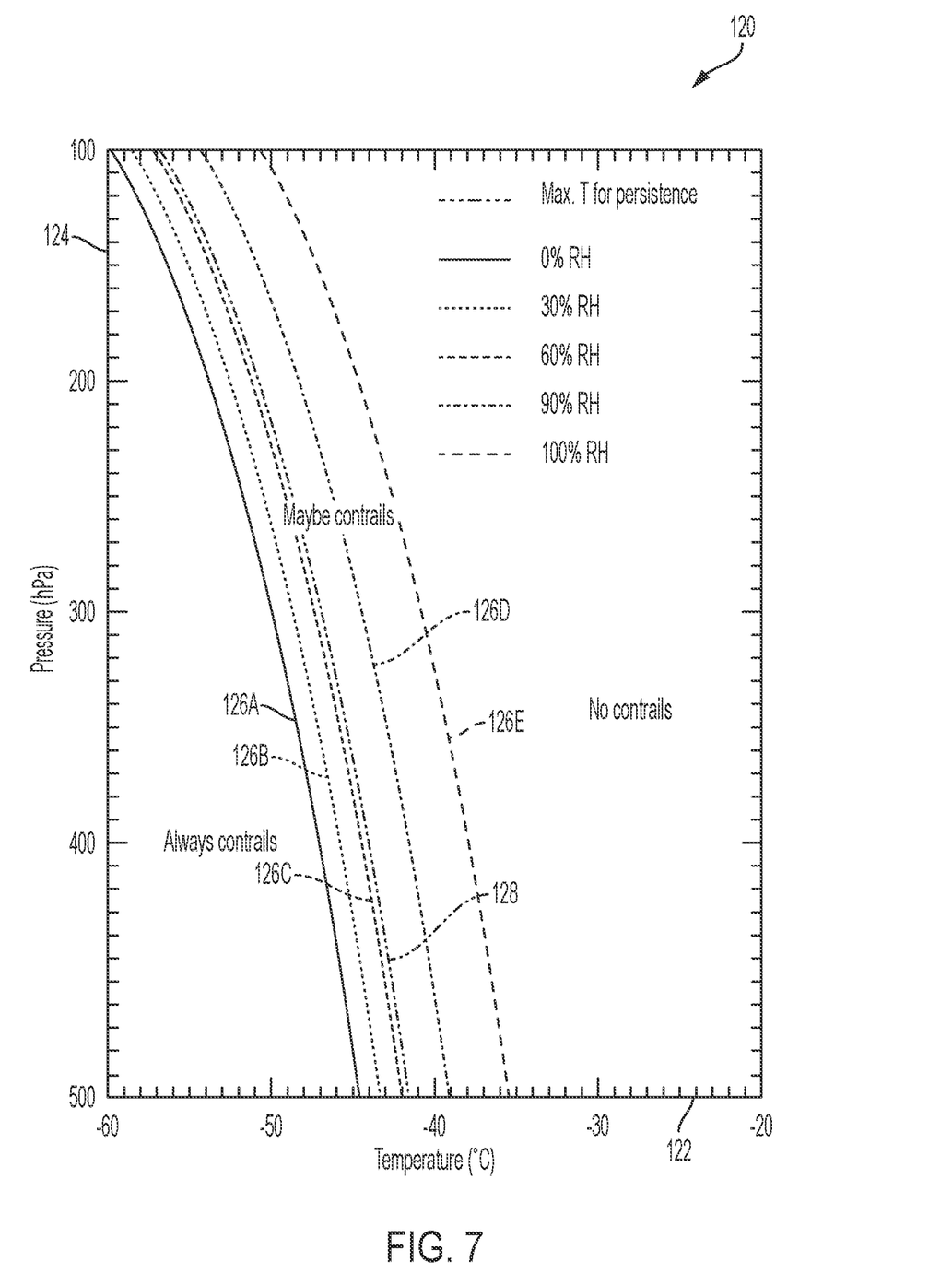
FIG. 7 is an example of an example chart showing relations between atmospheric conditions and contrail formation.

FIG. 7 is an example of an example chart showing relations between atmospheric conditions and contrail formation. In FIG. 7, chart 120 has horizontal axis 122, vertical axis 124, pressure/temperature relations 126A-126E and 128. Horizontal axis 122 is indicative of atmospheric temperature, and vertical axis is indicative of atmospheric pressure. Each of pressure/temperature relations 126A-126E and 128 identify a temperature-pressure combination that separates temperature-pressure combinations in which contrails form (e.g., contrail formation zones) from temperature-pressure combinations in which contrails will not form (e.g., contrail non-formation zones). Pressure/temperature relations 126A, 126B, 126C, 126D and 126E identify such temperature-pressure combinations that separate contrail formation zones from contrail non-formation zones in which the relative humidities are 0%, 30%, 60%, 90% and 100%, respectively. For example, if the relative humidity in the contrail formation zone is 30% and the temperature-pressure combination is to the left and/or below pressure/temperature relation 126B, then contrails will form therein. If, however, the temperature-pressure combination is to the right and/or above pressure/temperature relation 126B, then no contrail will form. Pressure/temperature relation 128 separates the region where contrails will not persist, should they be formed, from where contrails might persist after formation. For example, contrails will not persist after formation if the temperature-pressure combination is to the right and/or above pressure/temperature relation 128. Chart 120 is one example of a climate model, such as climate model 106 (as depicted in FIG. 5) that can be used to determine persistence of contrails. Various other climate models can be used to determine persistence as well. For example, such climate models can be obtained theoretically, empirically, or using various combinations thereof.

Figure 8:
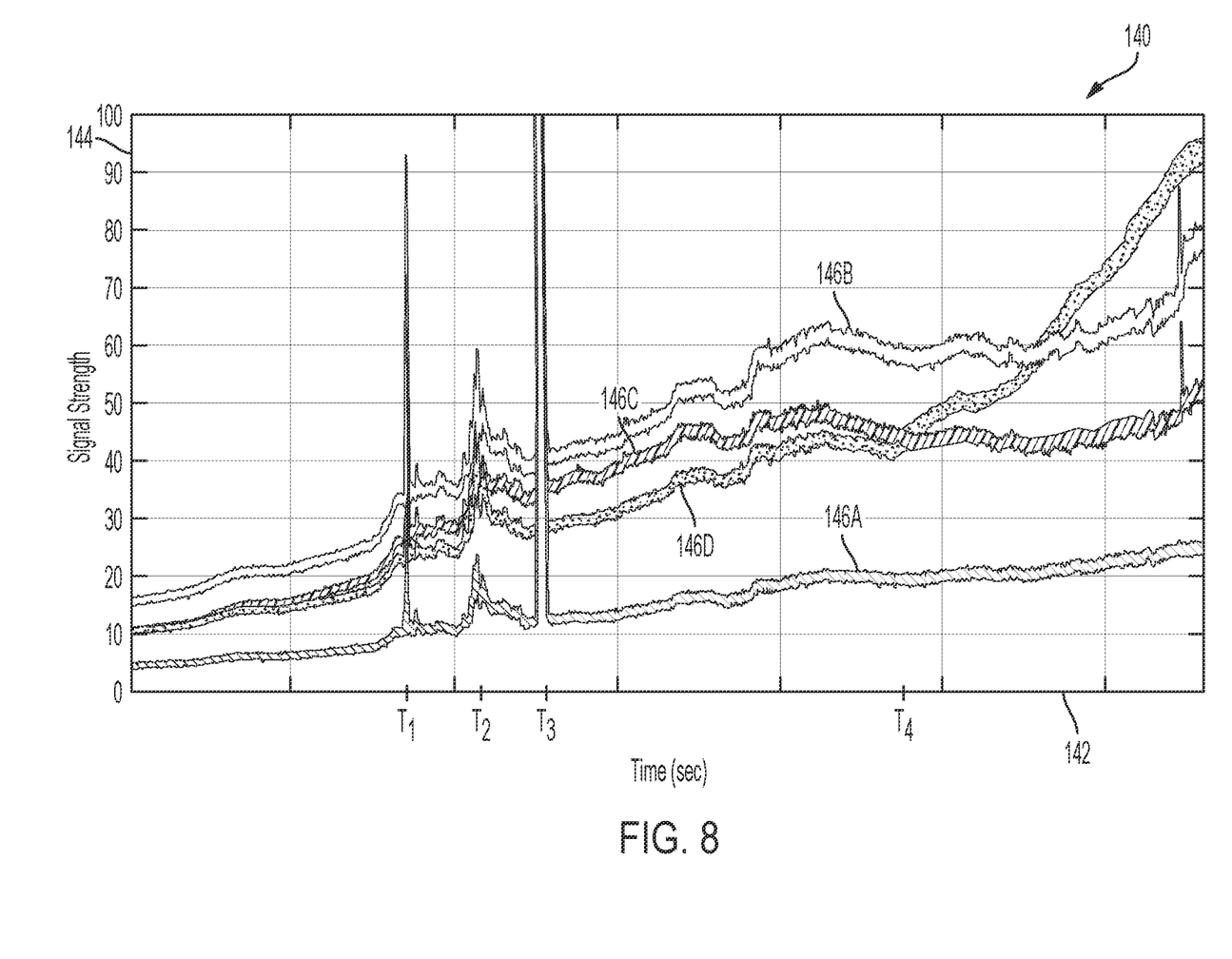
FIG. 8 is a graph depicting Mie-scattering content as determined by each channel of a four-channel optical air-data measurement system.

FIG. 8 is a graph depicting Mie-scattering content as determined by each channel of a four-channel optical air-data measurement system. In FIG. 8, graph 140 has horizontal axis 142, vertical axis 144 and Mie-scattering content/time relations 146A-146D, corresponding to channels A-D, respectively. Horizontal axis 142 is indicative of time (of aircraft flight), and vertical axis 144 is indicative of Mie-scattering content as determined by each of channels A-D of laser air-data system 92 (as depicted in FIG. 4). Mie-scattering content/time elations 146A-146D were obtained during a descent phase of an aircraft's flight. As described above, channels A-C are configured to measure air data outside the boundary layer of the airstream near the nose of aircraft 90 and channel D is configured to detect whether a contrail is forming in the exhaust path 96 of aircraft engine 98 (as depicted in FIG. 4). As evidenced by Mie-scattering content/time elations 146A-146D, Mie-scattering content increases dramatically at times $T_1$, $T_2$, and $T_3$ of the aircraft's descent. Because each of the four Mie-scattering content/time relations 146A-146D show a dramatic increase in Mie-scattering content at times $T_1$, $T_2$, and $T_3$ such signals are indicative of the cloud formations through which the aircraft is descending at such times. Because the Mie-scattering content in both the ambient region and in the contrail formation region are increasing at times $T_1$, $T_2$, and $T_3$, the ratios and/or differences between the Mie-scattering content of channel D to channels A-C are indicative of no contrail formation. After time $T_4$, however, Mie-scattering content/time relation 146D indicates Mie-scattering content that is increasing at a faster rate than the rates of increase of Mie-scattering content as indicated in Mie-scattering content/time relations 146A-146C. After Time $T_4$, the Mie-scattering content in the contrail formation region is higher than the Mie-scattering content in the ambient region, as evidenced by Mie-scattering content/time relation 146D crossing over Mie-scattering content/time relation 146C. Because the Mie-scattering content in the contrail formation region is increasing faster than the increase of Mie-scattering content in the ambient region after time $T_4$, the ratios and/or differences between the Mie-scattering content of channel D to channels A-C are indicative of contrail formation.

DISCUSSION OF POSSIBLE EMBODIMENTS

The following are non-exclusive descriptions of possible embodiments of the present invention.

Some embodiments relate to a system for measuring metrics of a condensation trail (contrail) produced by an aircraft engine. The system includes a first air-data measurement channel and an air data processor. The first air-data measurement channel includes a first light projector and a first optical receiver. The first light projector is configured to project a first beam of light into a first projection volume that intersects an exhaust path of the aircraft engine. The first optical receiver is configured to receive light from a first reception volume that intersects the first projection volume, thereby forming a first intersection volume. The first intersection volume intersects the exhaust path of the aircraft engine. The light received by the first optical receiver includes a first reflected portion of the first projected beam of light backscattered by the atmosphere from within the first intersection volume. The air-data processor is configured to: i) determine whether a contrail is forming within the exhaust path of the aircraft engine based on the first reflected portion of light received by the first optical receiver; and ii) generate a signal in response to the air-data processor determining that a contrail is forming within the intersection volume.

The system of the preceding paragraph can optionally include, additionally and/or alternatively, any one or more of the following features, configurations and/or additional components:

A further embodiment of the foregoing system, wherein the first intersection volume can intersect the exhaust path of the aircraft engine at a distance greater than a wing's length aft the aircraft engine.

A further embodiment of any of the foregoing systems, wherein the first air-data measurement channel can be laterally aligned with the aircraft engine.

A further embodiment of any of the foregoing systems, wherein the first reflected portion can have a first spectral response, from which a first Mie-scattering portion and a first Rayleigh-scattering portion are distinguished by the air-data processor. The air-data processor can be configured to determine a metric of aerosols in the exhaust path of the aircraft engine based on the first Mie-scattering portion.

A further embodiment of any of the foregoing systems can further include a second air-data measurement channel having a second light projector and a second optical receiver. The second light projector can be configured to project a second beam of light into a second projection volume that intersects undisturbed atmosphere outside a boundary layer about the aircraft. The second optical receiver is configured to receive light from a second reception volume that intersects the undisturbed atmosphere outside a boundary layer about the aircraft. A second intersection volume can be formed by an intersection of the second reception volume and the second projection volume. The light received by the second optical receiver can include a second reflected portion of the second projected beam backscattered by the undisturbed atmosphere from within the second intersection volume. The air-data processor can be configured to determine whether a contrail is forming within the exhaust path of the aircraft engine based on a comparison between the first and second reflected portions of light received by the first and second optical receivers, respectively.

A further embodiment of any of the foregoing systems, wherein the second reflected portion can have a second spectral response, from which a second Mie-scattering portion and a second Rayleigh-scattering portion are distinguished by the air-data processor. The air-data processor can be configured to determine a metric of aerosols in the undisturbed atmosphere outside the boundary layer about the aircraft based on the second Mie-scatter portion.

A further embodiment of any of the foregoing systems, wherein the air-data processor can be further configured to determine a metric of excess aerosols in the exhaust path of the aircraft engine based on a difference between the metric of aerosols in the exhaust path of the aircraft engine and the metric of aerosols in the undisturbed atmosphere outside the boundary layer about the aircraft.

A further embodiment of any of the foregoing systems, wherein the air-data processor can be further configured to determine persistence of any contrail that is determined to be forming within the first intersection volume, the persistence determined based on a relation between persistence of a contrail and static air temperature and static pressure of the undisturbed atmosphere outside the boundary layer about the aircraft.

A further embodiment of any of the foregoing systems, wherein the air-data processor can be further configured to: i) predict an altitude in which no contrail will be formed based on the relation between persistence of a contrail and static air temperature and static pressure of the undisturbed atmosphere outside the boundary layer about the aircraft; and ii) send a signal indicative of the altitude predicted to the aircraft.

A further embodiment of any of the foregoing systems, wherein the air-data processor can be further configured to generate an alert in response to determining that a contrail is forming in the exhaust path of the aircraft engine and that the persistence of the contrail is determined to be greater than a predetermined period of time.

A further embodiment of any of the foregoing systems, wherein the static air temperature and the static pressure are determined based on the second Mie-scattering portion.

A further embodiment of any of the foregoing systems, wherein the static air temperature and the static pressure are provided to the air-data processor by the aircraft.

A further embodiment of any of the foregoing systems can further include third and fourth air-data measurement channels, having a third or fourth light projector and a third or fourth optical receiver, respectively. Each of the third and fourth light projectors can be configured to project a third or fourth beam of light into a third of fourth projection volume, respectively, that intersects undisturbed atmosphere outside a boundary layer about the aircraft. Each of the third and fourth optical receivers is configured to receive light from a third or fourth reception volume, respectively, that intersects the undisturbed atmosphere outside a boundary layer about the aircraft. Each of third and fourth intersection volumes can be formed by an intersection of the third or fourth reception volume and the third of fourth projection volume, respectively. The light received by each of the third and fourth optical receivers can include a third or fourth reflected portion of the third or fourth projected beam backscattered by the undisturbed atmosphere from within the third or fourth intersection volume, respectively. The second, third, and fourth air-data measurement channels can measure air-data along three different direction vectors from one another, the three different direction vectors spanning three-dimensional space. The air-data processor can be configured to determine airflow of the undisturbed atmosphere in three-dimensional space.

A further embodiment of any of the foregoing systems, wherein the air-data processor can be further configured to: i) receive aircraft inertial data from the aircraft; ii) determine true vertical airspeed based in the inertial data received and the metrics of air data calculated; and iii) determine persistence of any contrail that is determined to be forming within the exhaust path of the aircraft engine based on the true vertical airspeed determined.

A further embodiment of any of the foregoing systems, wherein the air-data processor can be further configured to receive an engine aerosol model corresponding to the aircraft engine. Determination of whether a contrail is forming within the exhaust path of the aircraft engine can be further based on the engine aerosol model received.

Some embodiments relate to a method for measuring metrics of a condensation trail (contrail) produced by an aircraft engine. In the method, a first beam of light is projected, via a first light projector of a first air-data measurement channel, into a first projection volume that intersects an exhaust path of the aircraft engine. Light from a first reception volume is received, via a first optical receiver of the first air-data measurement channel. The first reception volume intersects the first projection volume, thereby forming a first intersection volume. The first intersection volume intersects the exhaust path of the aircraft engine. The light received by the first optical receiver includes a first reflected portion of the first projected beam backscattered by the atmosphere from within the first intersection volume. Whether a contrail is forming within the exhaust path of the aircraft engine is determined, via an air-data processor, based on the first reflected portion of the light received by the first optical receiver. A signal is generated, via the air-data processor, in response to the air-data processor determining that a contrail is forming within the intersection volume.

The method of the preceding paragraph can optionally include, additionally and/or alternatively, any one or more of the following features, configurations and/or additional components:

A further embodiment of the foregoing method can further include: i) distinguishing, via the air-data processor, between a first Mie-scattering portion and a first Rayleigh-scattering portion of the first reflected portion; and ii) determining, via the air-data processor, a metric of aerosols in the exhaust path of the aircraft based on the first Mie-scattering portion.

A further embodiment of any of the foregoing methods can further include: i) projecting, via a second light projector of a second air-data measurement channel, a second beam of light into a second projection volume that intersects undisturbed atmosphere outside a boundary layer about the aircraft; ii) receiving, via a second optical receiver of the second air-data measurement channel, light from a second reception volume that intersects the second projection volume, thereby forming a second intersection volume, wherein the second intersection volume intersects the undisturbed atmosphere outside a boundary layer about the aircraft, wherein the light received by the second optical receiver includes a second reflected portion of the second projected beam backscattered by the atmosphere from within the second intersection volume; and iii) determining, via the air-data processor, whether a contrail is forming within the exhaust path of the aircraft engine based on a comparison between the first and second reflected portions of light received by the first and second optical receivers, respectively.

A further embodiment of any of the foregoing methods, can further include: i) distinguishing, via the air-data processor, between a first Mie-scattering portion and a first Rayleigh-scattering portion of the first reflected portion; and ii) determining, via the air-data processor, a metric of aerosols in the undisturbed atmosphere outside a boundary layer about the aircraft based on the first Mie-scattering portion.

A further embodiment of any of the foregoing methods can further include determining, via the air-data processor, a metric of excess aerosols in the exhaust path of the aircraft engine based on a difference between the metric of aerosols in the exhaust path of the aircraft engine and the metric of aerosols in the undisturbed atmosphere outside the boundary layer about the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for measuring metrics of a condensation trail (contrail) produced by an aircraft engine, the system comprising:
    a first air-data measurement channel including:
        a first light projector configured to project a first beam of light into a first projection volume that intersects an exhaust path of the aircraft engine;
        a first optical receiver configured to receive light from a first reception volume that intersects the first projection volume, thereby forming a first intersection volume, wherein the first intersection volume intersects the exhaust path of the aircraft engine, wherein the light received by the first optical receiver includes a first reflected portion of the first projected beam of light backscattered by the atmosphere from within the first intersection volume; and
    an air-data processor configured to:
        determine whether a contrail is forming within the exhaust path of the aircraft engine based on the first reflected portion of light received by the first optical receiver; and
        generate a signal in response to the air-data processor determining that a contrail is forming within the intersection volume.

2. The system of claim 1, wherein the first intersection volume intersects the exhaust path of the aircraft engine at a distance greater than a wing's length aft the aircraft engine.

3. The system of claim 1, wherein the first air-data measurement channel is laterally aligned with the aircraft engine.

4. The system of claim 1, wherein the air-data processor is further configured to:
    receive an engine aerosol model corresponding to the aircraft engine,
    wherein determination of whether a contrail is forming within the exhaust path of the aircraft engine is further based on the engine aerosol model received.

5. The system of claim 1, wherein the first reflected portion has a first spectral response, from which a first Mie-scattering portion and a first Rayleigh-scattering portion are distinguished by the air-data processor, wherein the air-data processor is configured to determine a metric of aerosols in the exhaust path of the aircraft engine based on the first Mie-scattering portion.

6. The system of claim 5, further comprising:
    a second air-data measurement channel including:
        a second light projector configured to project a second beam of light into a second projection volume that intersects undisturbed atmosphere outside a boundary layer about the aircraft; and
        a second optical receiver configured to receive light from a second reception volume that intersects the undisturbed atmosphere outside a boundary layer about the aircraft, wherein a second intersection volume is formed by an intersection of the second reception volume and the second projection volume, wherein the light received by the second optical receiver includes a second reflected portion of the second projected beam backscattered by the undisturbed atmosphere from within the second intersection volume,
    wherein the air-data processor is configured to determine whether a contrail is forming within the exhaust path of the aircraft engine based on a comparison between the first and second reflected portions of light received by the first and second optical receivers, respectively.

7. The system of claim 6, further comprising:
    a third air-data measurement channel including:
        a third light projector configured to project a third beam of light into a third projection volume that intersects undisturbed atmosphere outside a boundary layer about the aircraft; and
        a third optical receiver configured to receive light from a third reception volume that intersects the undisturbed atmosphere outside a boundary layer about the aircraft, wherein a third intersection volume is formed by an intersection of the third reception volume and the third projection volume, wherein the light received by the third optical receiver includes a third reflected portion of the third projected beam backscattered by the undisturbed atmosphere from within the third intersection volume; and
    a fourth air-data measurement channel,
        a fourth light projector configured to project a fourth beam of light into a fourth projection volume that intersects undisturbed atmosphere outside a boundary layer about the aircraft; and
        a fourth optical receiver configured to receive light from a fourth reception volume that intersects the undisturbed atmosphere outside a boundary layer about the aircraft, wherein a fourth intersection volume is formed by an intersection of the fourth reception volume and the fourth projection volume, wherein the light received by the fourth optical receiver includes a fourth reflected portion of the fourth projected beam backscattered by the undisturbed atmosphere from within the fourth intersection volume; and
    wherein the second, third, and fourth air-data measurement channels measure air-data along three different direction vectors from one another, the three different direction vectors spanning three-dimensional space;
wherein the air-data processor is configured to determine airflow of the undisturbed atmosphere in three-dimensional space.

8. The system of claim 7, wherein the air-data processor is further configured to:
receive aircraft inertial data from the aircraft;
determine true vertical airspeed based in the inertial data received and the metrics of air data calculated; and
determine persistence of any contrail that is determined to be forming within the exhaust path of the aircraft engine based on the true vertical airspeed determined.

9. The system of claim 6, wherein:
the second reflected portion has a second spectral response, from which a second Mie-scattering portion and a second Rayleigh-scattering portion are distinguished by the air-data processor, wherein the air-data processor is configured to determine a metric of aerosols in the undisturbed atmosphere outside the boundary layer about the aircraft based on the second Mie-scatter portion.

10. The system of claim 9, wherein the air-data processor is further configured to:
determine a metric of excess aerosols in the exhaust path of the aircraft engine based on a difference between the metric of aerosols in the exhaust path of the aircraft engine and the metric of aerosols in the undisturbed atmosphere outside the boundary layer about the aircraft.

11. The system of claim 9, wherein the air-data processor is further configured to:
determine persistence of any contrail that is determined to be forming within the first intersection volume, the persistence determined based on a relation between persistence of a contrail and static air temperature and static pressure of the undisturbed atmosphere outside the boundary layer about the aircraft.

12. The system of claim 11, wherein the air-data processor is further configured to:
predict an altitude in which no contrail will be formed based on the relation between persistence of a contrail and static air temperature and static pressure of the undisturbed atmosphere outside the boundary layer about the aircraft; and
send a signal indicative of the altitude predicted to the aircraft.

13. The system of claim 11, wherein the air-data processor is further configured to:
generate an alert in response to determining that a contrail is forming in the exhaust path of the aircraft engine and that the persistence of the contrail is determined to be greater than a predetermined period of time.

14. The system of claim 11, wherein the static air temperature and the static pressure are determined based on the second Mie-scattering portion.

15. The system of claim 11, wherein the static air temperature and the static pressure are provided to the air-data processor by the aircraft.

16. A method for measuring metrics of a condensation trail (contrail) produced by an aircraft engine, the method comprising:

projecting, via a first light projector of a first air-data measurement channel, a first beam of light into a first projection volume that intersects an exhaust path of the aircraft engine;
receiving, via a first optical receiver of the first air-data measurement channel, light from a first reception volume that intersects the first projection volume, thereby forming a first intersection volume, wherein the first intersection volume intersects the exhaust path of the aircraft engine, wherein the light received by the first optical receiver includes a first reflected portion of the first projected beam backscattered by the atmosphere from within the first intersection volume;
determining, via an air-data processor, whether a contrail is forming within the exhaust path of the aircraft engine based on the first reflected portion of the light received by the first optical receiver; and
generating, via the air-data processor, a signal in response to the air-data processor determining that a contrail is forming within the intersection volume.

17. The method of claim 16, further comprising:
distinguishing, via the air-data processor, between a first Mie-scattering portion and a first Rayleigh-scattering portion of the first reflected portion; and
determining, via the air-data processor, a metric of aerosols in the exhaust path of the aircraft based on the first Mie-scattering portion.

18. The method of claim 17, further comprising:
projecting, via a second light projector of a second air-data measurement channel, a second beam of light into a second projection volume that intersects undisturbed atmosphere outside a boundary layer about the aircraft;
receiving, via a second optical receiver of the second air-data measurement channel, light from a second reception volume that intersects the second projection volume, thereby forming a second intersection volume, wherein the second intersection volume intersects the undisturbed atmosphere outside a boundary layer about the aircraft, wherein the light received by the second optical receiver includes a second reflected portion of the second projected beam backscattered by the atmosphere from within the second intersection volume; and
determining, via the air-data processor, whether a contrail is forming within the exhaust path of the aircraft engine based on a comparison between the first and second reflected portions of light received by the first and second optical receivers, respectively.

19. The method of claim 18, further comprising:
distinguishing, via the air-data processor, between a first Mie-scattering portion and a first Rayleigh-scattering portion of the first reflected portion; and
determining, via the air-data processor, a metric of aerosols in the undisturbed atmosphere outside a boundary layer about the aircraft based on the first Mie-scattering portion.

20. The method of claim 19, further comprising:
determining, via the air-data processor, a metric of excess aerosols in the exhaust path of the aircraft engine based on a difference between the metric of aerosols in the exhaust path of the aircraft engine and the metric of aerosols in the undisturbed atmosphere outside the boundary layer about the aircraft.

* * * * *